United States Patent [19]

Neuerburg

[11] Patent Number: 4,999,981
[45] Date of Patent: Mar. 19, 1991

[54] MOWER WITH ASSEMBLY OF CUTTING ELEMENTS
[75] Inventor: Horst Neuerburg, Saverne, France
[73] Assignee: Kuhn S.A., Saverne, France
[21] Appl. No.: 426,417
[22] Filed: Oct. 25, 1989
[30] Foreign Application Priority Data
Oct. 26, 1988 [FR] France ............................ 88 14235
[51] Int. Cl.⁵ ........................ A01D 34/76; A01D 75/18
[52] U.S. Cl. ............................. 56/6; 56/255;
56/295; 56/DIG. 6; 56/DIG. 9
[58] Field of Search ............... 56/255, 295, 6, DIG. 6,
56/DIG. 9, DIG. 17

[56] References Cited
U.S. PATENT DOCUMENTS
3,044,241 7/1962 Snider .................................. 56/295
4,365,462 12/1982 Werner et al. ...................... 56/255
4,827,703 5/1989 van der Lely ........................ 56/6

4,833,868 5/1989 Ermacora et al. ...................... 56/6

FOREIGN PATENT DOCUMENTS
0325548 7/1989 European Pat. Off. .
3706222 9/1988 Fed. Rep. of Germany .
2089637 6/1982 United Kingdom ................. 56/295
2179534 3/1987 United Kingdom .

Primary Examiner—Ramon S. Britts
Assistant Examiner—Terry L. Melius
Attorney, Agent, or Firm—Oblon, Spivak, McClelland, Maier & Neustadt

[57] ABSTRACT

The shaft 20 of a rotary cutting element 10 driven from below includes a break zone 41 at its end 19 extending upwardly outside the bearing 24. The rotary cutting element separates entirely from the cutting bar when the shaft breaks at the break zone upon contact of the cutting element with an obstacle.

38 Claims, 5 Drawing Sheets

MOWER WITH ASSEMBLY OF CUTTING ELEMENTS

FIELD OF THE INVENTION

This invention relates to a mower comprising a cutting bar provided with a carrying beam above which there extends a plurality of rotary cutting elements. Each of the rotary cutting elements turns around a geometric axis directed upwardly, and at least one of the rotary cutting elements is driven from below by drive elements housed in the carrying beam and comprising gears. Each rotary cutting element driven from below is connected rigidly to a shaft turning around the corresponding geometric axis. For this purpose, the shaft is guided in a bearing unit connected rigidly to the carrying beam. Additionally, the shaft is connected rigidly at its lower end to one of the gears.

BACKGROUND OF THE INVENTION

Such mowers are widely known on the market. When operating, they are hitched to a tractor vehicle, and their rotary cutting elements are driven in rotation by a motor source that most often consists of the power take off of the tractor vehicle. While turning, the rotary cutting elements cut the product to be harvested.

During mowing, it can happen that one of the rotary cutting elements comes in contact with an obstacle that can brake or block for an instant the rotation of that rotary cutting element. The motor source, on the other hand, continues to deliver power. The other non-braked or non-blocked rotary cutting elements then very suddenly give back the kinetic energy that they have stored due to their weight and their high rotation rate.

The sudden absorption of this kinetic energy and of the energy furnished by the motor source by the gear or gears connected to the braked or blocked rotary cutting element can cause breaks in the toothing of those gears. Moreover, it is known in practice that a break at the level of a tooth of a gear causes a sort of chain reaction resulting in the deterioration of other gears. Repairing a cutting bar that underwent such a deterioration requires not only a very long immobilization of the mower with the risk of losing harvest, but additionally causes very high costs.

OBJECT OF THE INVENTION

The object of this invention is to solve or ameliorate the problem described above.

SUMMARY OF THE INVENTION

For this purpose, the mower according to this invention is characterized in that the shaft of each rotary cutting element driven from below comprises a break zone at its end extending upwardly outside the bearing.

In the mower according to the invention, the spot where the break will occur in the case of a sudden stress caused by a braking or a blocking of a rotary cutting element has therefore been determined in advance. Advantageously, this spot is located at the level of the shaft and not at the level of the toothing of the corresponding gear. Additionally, the break zone is provided at the end of the shaft extending upwardly outside the bearing. Thus, in case of a break, the rotary cutting element separates entirely from the cutting bar and thus does not risk, in turn, braking or blocking the adjacent rotary cutting elements. Additionally, the remaining shaft portion and the corresponding gear continue to be guided in rotation by the bearing. In this way, the meshing of that gear with the adjacent gear or gears remains assured.

The mower according to this invention thus offers a very high reliability at the level of the drive elements placed in the carrying beam. In this way, in case of a break, the immobilization time and the repair costs will be very limited. In fact, it will suffice simply to replace the broken shaft.

A yet more rapid replacement will be achieved when the bearing unit is centered in a corresponding bore made in the upper part of the carrying beam and the diameter of which is greater than the outside diameter of the corresponding gear, the body of the bearing unit being rigidly but detachably connected to the upper part of the carrying beam by assembly elements that can be maneuvered from outside the carrying beam. In this case, it will not even be necessary to transport the mower to a repair shop. It will actually be possible to make repair in the field itself, since the carrying beam does not need to be completely opened. It will suffice simply to detach the bearing unit guiding the broken shaft, which is possible because the assembly elements connecting the body of the bearing unit to the carrying beam can be maneuvered from the outside and because the diameter of the bore made in the carrying beam is larger than the outside diameter of the corresponding gear. When the bearing unit with the broken shaft and the corresponding gear is detached, it will be possible to emplace a new preassembled unit comprising a bearing unit, a shaft and a gear. Accordingly, the mower is very rapidly again ready to function. This characteristic is particularly advantageous for users who cannot tolerate loss time during the harvest.

Advantageously, the break zone consists of a large change of section of the shaft—such as a groove, for example.

According to an additional characteristic of the invention, the shaft of each rotary cutting element driven from below comprises at its end extending upwardly outside the bearing a stopping element provided between the break zone and the inner race of the bearing and sized, shaped, and positioned to prevent the translation of the shaft along the corresponding geometric axis of rotation, particularly after breaking of the shaft at the level of the break zone.

In this case, the stopping element prevents the remaining shaft portion from slipping downwardly if the user does not immediately see that a break has occurred. Therefore, the gear that is connected to the lower end of the remaining shaft portion is kept from coming in contact with the lower part of the carrying beam.

This characteristic is further particularly significant when the bearing is an angular contact bearing with two rows of balls the inner race of which is in two parts. After breaking of the shaft, the stopping element thus keeps the two parts of the inner race of the bearing at least approximately in place. In this case, the guiding in rotation of the remaining shaft portion and of the corresponding gear is also assured to maintain the meshing between that gear and the adjacent gears.

A particularly simple embodiment of the stopping element is achieved when the stopping element consists of a shoulder made directly on the shaft.

In the invention, it can be provided that, at its upper end, the shaft is connected rigidly to a driver to which the corresponding rotary cutting element is rigidly connected. The inner race of the bearing is clamped between the driver and the gear connected rigidly to the lower end of the shaft. It can additionally be provided that the driver is rigidly and undetachably connected to the upper end of the shaft, while the gear is rigidly but detachably connected to the lower end of the shaft. The inner race of the bearing can then be clamped between the driver and said gear by a threaded connecting element screwed at the lower end of the shaft.

In both these cases, it is provided that, before breaking of the shaft, at the level of the break zone there is a very slight play between the stopping element and the inner race of the bearing. In this way, it is assured that the inner race of the bearing is actually clamped between the corresponding driver and the corresponding gear.

In the case where the stopping element is provided only to hold the remaining shaft portion after breaking, it is possible to give it a relatively small height and width. This assures a maximum seat between the driver and the shaft on the one hand and between the driver and the inner race of the bearing on the other hand without harming the thickness of the cutting bar.

DETAILED DESCRIPTION OF THE PRESENTLY PREFERRED EMBODIMENT

Figure 1:
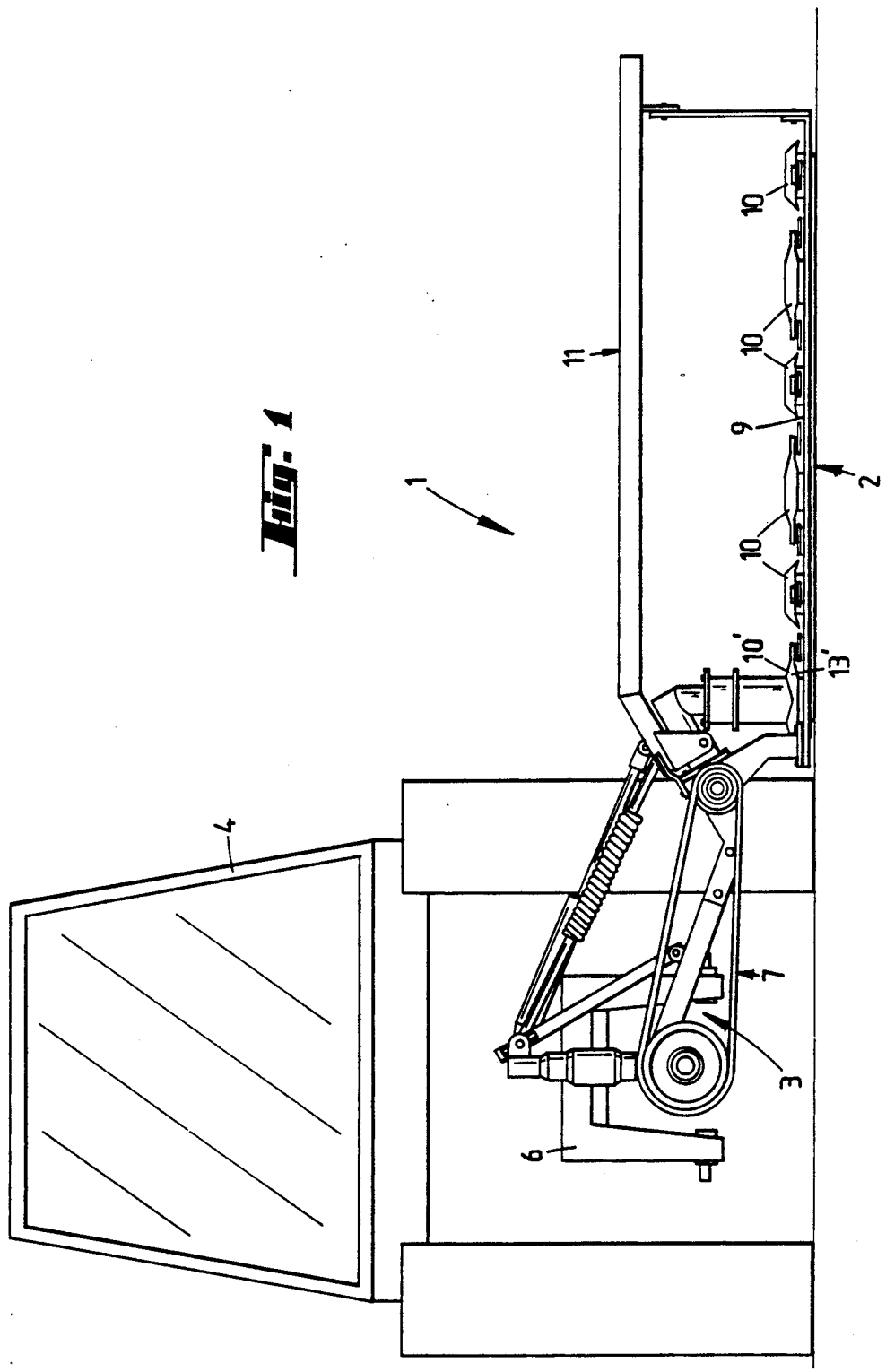
FIG. 1 is a view from the rear of a mower according to the invention hitched to a tractor vehicle.

A mower 1 according to the invention comprises a mowing group 2 and a frame 3 to which the mowing group 2 is connected. During operation, the mower 1 is hitched to the hitching device (not shown) of a tractor vehicle 4 so that the mowing group 2 extends crosswise to the working direction 5 (see FIG. 2). For this purpose, the frame 3 is provided with a hitching device 6 sized, shaped, and positioned to be coupled to the hitching device of the tractor vehicle 4.

The frame 3 also carries part of a plurality of transmission elements 7 that transmit the movement from the power take off (not shown) of the tractor vehicle 4 to a plurality of drive elements 8 (see FIGS. 2 and 3) of the mowing group 2.

The mowing group 2 comprises a cutting bar 9 provided with a plurality of rotary cutting elements 10, 10' and a carrying structure 11 which carries the cutting bar 9 and by which the mowing group 2 is connected to the frame 3.

The cutting bar 9 appears in greater detail in the following figures. It comprises a carrying beam 12 made in the form of a housing above which the cutting elements 10, 10' extend. Each cutting element 10, 10' consists of a support element 13, 13', a plurality of cutting tools 14, and a plurality of connecting devices 15 each connecting, in an articulated manner, a cutting tool 14 to the outer edge 16 of the corresponding support element 13, 13'.

Each rotating cutting element 10 driven from below is connected to a driver 17 by a plurality of bolts 18. Said driver 17 is rigidly connected to the upper end 19 of a shaft 20. In the example illustrated, this connection is made by welding so that the driver 17 is undetachably connected to the shaft 20. The shaft 20 is guided in rotation in a bearing unit 21 around a geometric axis 22 extending upwardly.

Said bearing unit 21 comprises a bearing body 23 and a bearing 24. In the example illustrated, this bearing 24 is an angular contact bearing with two rows of balls the inner race 25 of which is in two parts 26, 27. The bearing body 23 is connected detachably to the upper part 28 of the carrying beam 12 by a plurality of bolts 29 and a plurality of nuts 30 that can be maneuvered from the outside—i.e., without having to detach the upper part 28 of the carrying beam 12 from the lower part 31 of the carrying beam 12.

Figure 2:
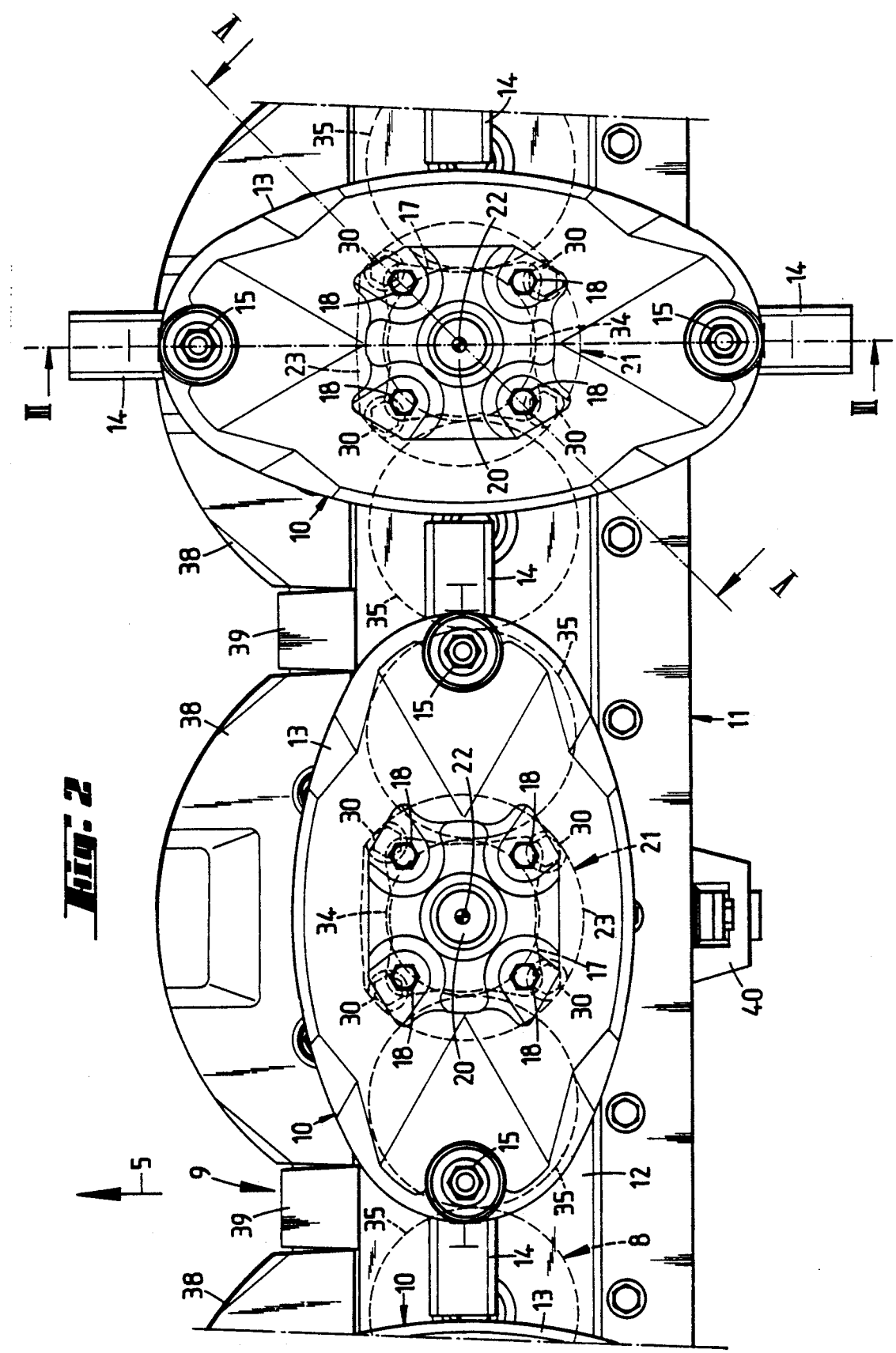
FIG. 2 is, on a larger scale, a partial top view of the mowing group of the mower according to FIG. 1.
Figure 3:
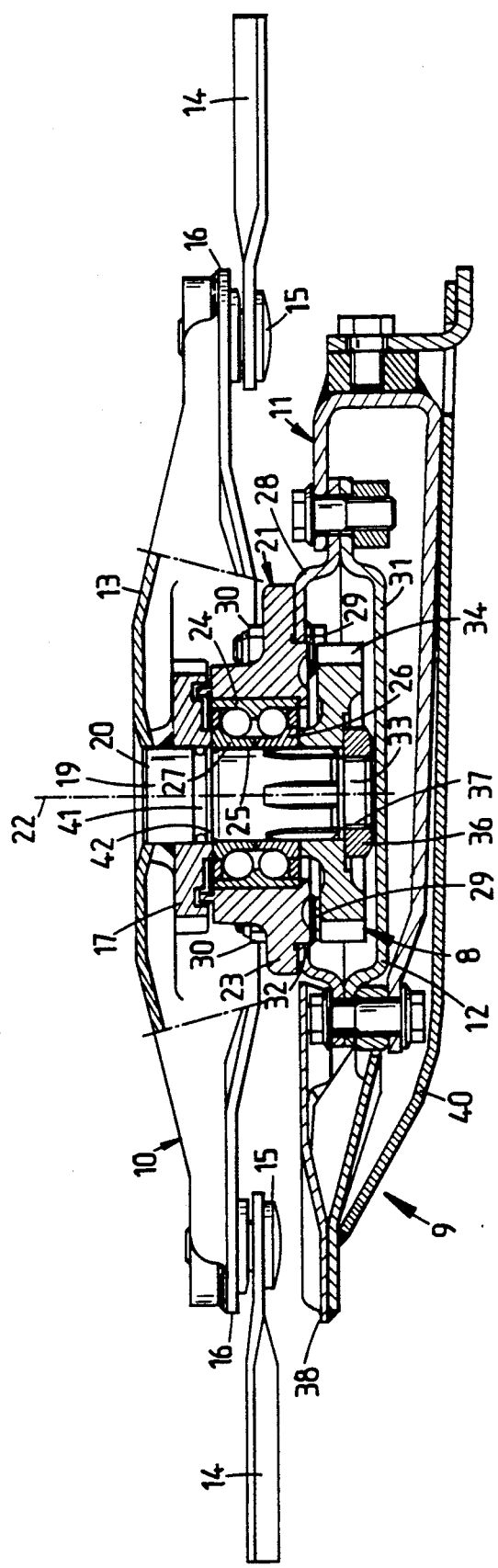
FIG. 3 is a partial view of the mowing group of FIG. 2 cut along the plane III—III in FIG. 2.

In FIG. 3 it can additionally be seen that the bearing body 23 is centered in a bore 32 provided for this purpose in the upper part 28 of the carrying beam 12. At its lower end 33 (i.e., the end that extends in the interior of the carrying beam 12), the shaft 20 is rigidly connected to a cylindrical gear 34. The outside diameter of the cylindrical gear 34 is less than the diameter of the bore 32. Said cylindrical gear 34 meshes with at least one adjacent intermediate cylindrical gear 35 (FIG. 2) also housed in the carrying beam 12. The cylindrical gears 34, 35 constitute the drive elements 8.

Although the cylindrical gear 34 is connected rigidly to the shaft 20, the connection is detachable. Moreover, it further appears in FIG. 3 that the inner race 25 of the bearing 24 is clamped between the driver 17 and the cylindrical gear 34 by a nut 36 screwed onto a threaded part 37 provided at the lower end 33 of the shaft 20.

In front, the carrying beam 12 is provided with a plurality of protective elements 38 each of which extends under a corresponding cutting element 10, 10'. The protective elements 38 function to protect the support elements 13, 13' of the cutting elements 10, 10' from obstacles found on the ground to be mowed.

In FIG. 2, it can additionally be seen that, between each two neighbouring protective elements 38, there is placed a shielding element 39 that covers a front edge of the carrying beam 12 and that has a width at least approximately equal to the distance separating each two adjacent protective elements 38. To each protective element 38 there is further fixed a skid 40 that extends rearwardly, passing under the carrying beam 12, and that is fixed to the rear of the carrying structure 11.

Figure 6:
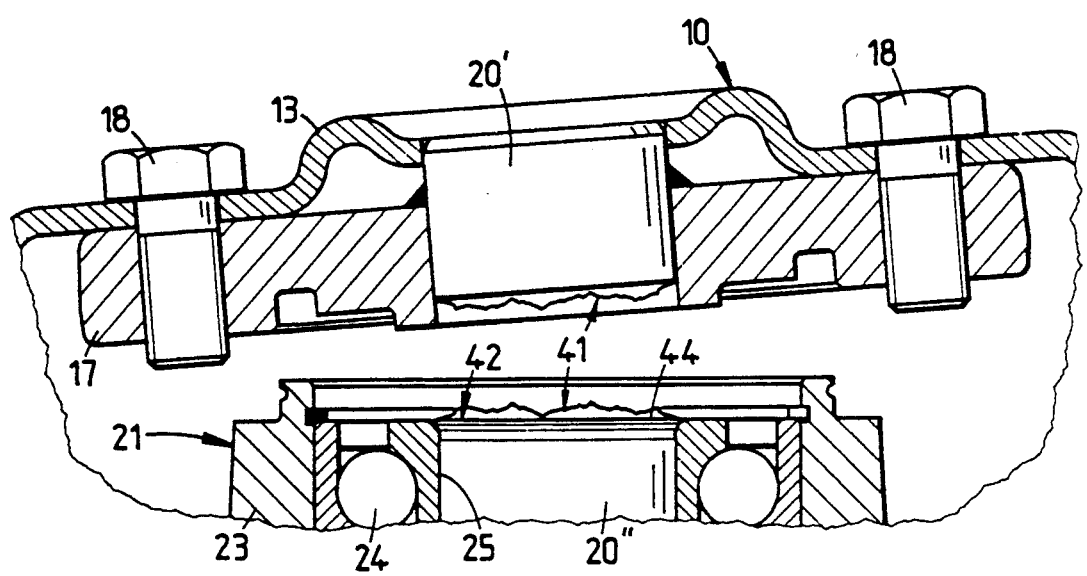
FIG. 6 illustrates the breaking of the shaft at the level of the break zone.

In FIG. 3 is can also be seen that, according to one aspect of the invention, the shaft 20 of each rotary cutting element 10 driven from below comprises a break zone 41 at its upper end 19 extending upwardly outside the corresponding bearing 24. According to an additional aspect of the invention, a stopping element 42 is provided between the break zone 41 and the inner race 25 of the corresponding bearing 24. The stopping element 42 is provided between the break zone 41 and the inner race 25 of the corresponding bearing 24. The stopping element 42 is sized, shaped, and positioned to prevent the translation of the portion 20" of the shaft 20 (FIG. 6) along the geometric axis 22 after breaking of the shaft 20 at the level of the break zone 41.

Figure 4:
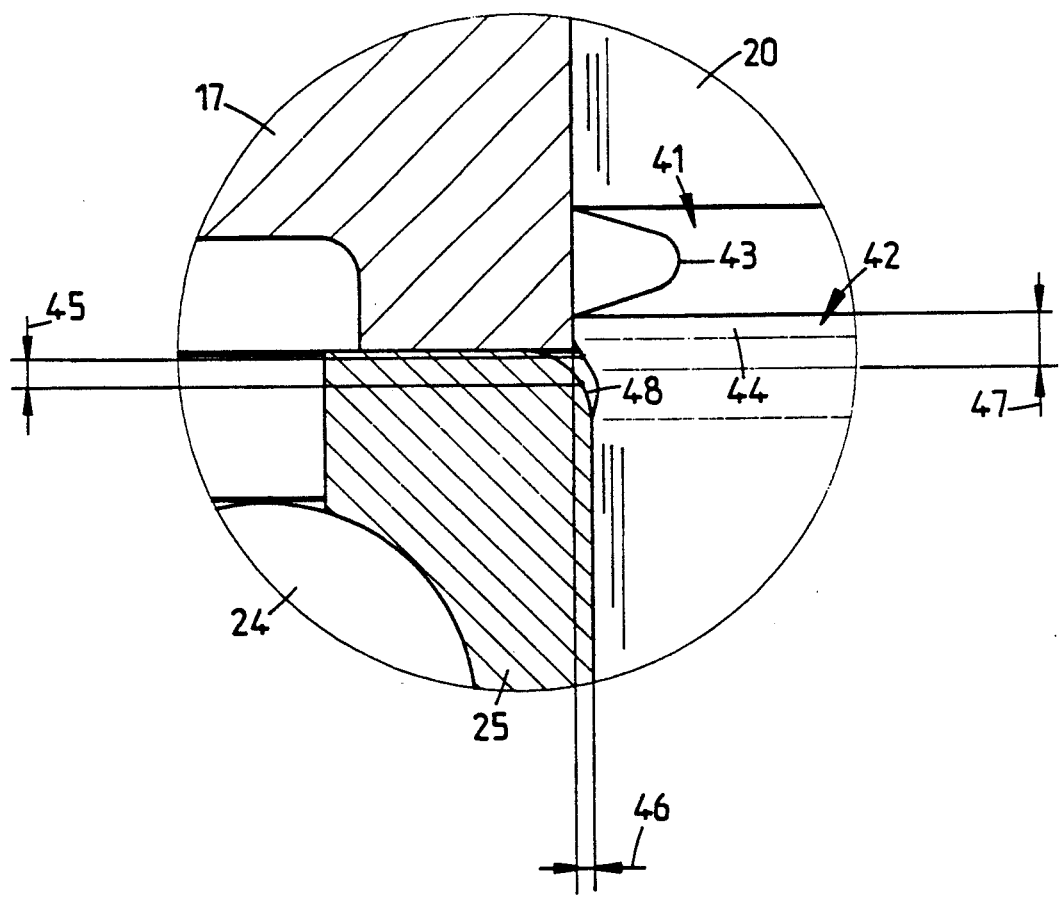
FIG. 4 shows, on a very enlarged scale, the assembly of the shaft of a cutting element in the corresponding bearing and driver.
Figure 5:
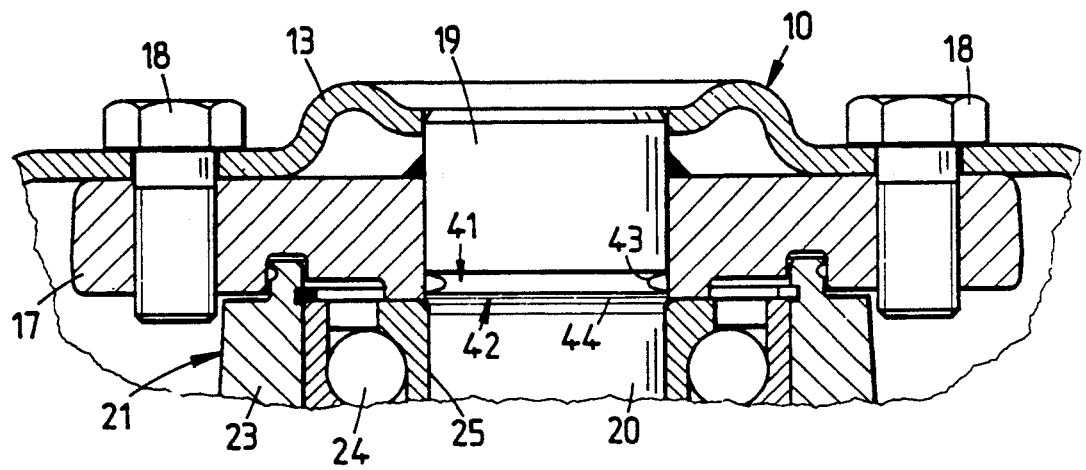
FIG. 5 is, on an enlarged scale, a partial view of the assembly of a cutting element before breaking of the shaft, cut along the plane V—V in FIG. 2.

The break zone 41 and the stopping element 42 appear in greater detail in FIG. 4.

In the example illustrated, the break zone 41 consists of a groove 43, relatively deep so as to create a large change in section. The shape as well as the dimensions of the groove 43 are such that, at this level, the resistance of the shaft 20 to abnormal stresses is less than the resistance of the toothing of the corresponding cylindrical gear 34.

The stopping element 42, in the example illustrated, consists of a shoulder 44 on the shaft 20. As said above, the shoulder 44 is provided between the groove 43 and the inner race 25 of the bearing 24. To assure that the inner race 25 of the bearing 24 is actually clamped between the cylindrical gear 34 and the corresponding driver 17, there is provided, before breaking of the shaft 20, a play 45 between the inner race 25 of the bearing 24 and the shoulder 44. The play 45 should advantageously be very slight in order to assure that the two parts 26, 27 of the inner race 25 of the bearing 24 cannot practically come apart after breaking of the shaft 20.

In FIG. 4, it can also be seen that the height 46 and the width 47 of the shoulder 44 are advantageously relatively small. In the example illustrated, the height 46 of the shoulder 44 does not exceed the value of the radius 48 of the inner race 25 of the bearing 24.

The mower 1 according to the invention functions as follows.

During operation, the tractor vehicle 4 moves the mower 1 in the work direction 5. The power take off of the tractor vehicle 4 provides the movement to the transmission elements 7 that transmit the power to the drive elements 8 housed in the carrying beam 12 to drive the rotary cutting element 10, 10' in rotation around their corresponding geometric axes 22.

When, during operation, a cutting element 10 driven from below accidentally comes in contact with an obstacle, that cutting element 10 will be braked or blocked. The power take off of the tractor vehicle 4, on the other hand, will continue to deliver power. The other rotary cutting elements 10, 10', because of their weight and their higher rotation rate, will have stored a large amount of kinetic energy that they will suddenly give back. The sudden absorption of this kinetic energy and of the energy provided by the power take off generally causes a break.

In the mower 1 according to the invention, the spot where the break will occur has been defined in advance, since the break zone 41 (i.e., the groove 43) has been provided on the shaft 20 on each rotary cutting element 10 driven from below. Such a break has been illustrated in FIG. 6. As explained above, the break zone 41 is provided at the upper end 19 of the shaft 20 extending outside the corresponding bearing 24. This offers several advantages. A first advantage consists in the fact that the break has been transferred from the toothing of the corresponding cylindrical gear 34 and/or the neighbouring intermediate cylindrical gears 35 to the shaft 20. A second advantage consists in the fact that the rotary cutting element 10 (along with the driver 17 and the upper portion 20' of the broken shaft 20) detaches entirely from the cutting bar 9 and therefore in turn does not risk braking or blocking the adjacent cutting elements 10. A third advantage consists in the fact that the lower portion 20" of the broken shaft 20 continues to be perfectly guided in rotation in the bearing 24. In this way, the meshing of the cylindrical gear 34 with the neighboring intermediate cylindrical gears 35 remains assured.

As also explained above, the stopping element 42 (i.e., the shoulder 44) has been provided between the break zone 41 (i.e., the groove 43) and the inner race 25 of the bearing 24. Thanks to the stopping element 42 (i.e., the shoulder 44), the two parts 26, 27 of the inner race 25 of the bearing 24 are kept at least approximately in place after breaking of the shaft 20 at the level of the break zone 41 (i.e., the groove 43). This contributes to maintaining the perfectly meshing between the cylindrical gear 34 and the adjacent intermediate cylindrical gears 35 after breaking of the shaft 20.

The replacement of a bearing unit 21 is performed as follows:

(1) The nuts 30 are unscrewed, which is possible to do without separating the upper part 28 of the carrying beam 12 from the lower part 31 of the carrying beam 12;

(2) The unit consisting of a bearing unit 21, the portion 20" of the shaft 20, and the cylindrical gear 34 is removed from the carrying beam 12, which is possible since the outside diameter of the cylindrical gear 34 is less than the diameter of the bore 32;

(3) A new preassembled unit consisting of a bearing unit 21, a shaft 20, a driver 17, and a cylindrical gear 34 is installed on the carrying beam 12; and (4) The cutting element 10 is fixed on the new driver 17 if the cutting element 10 has not been damaged during the impact or, if the cutting element 10 has been damaged during the impact, a new cutting element 10 is also installed.

This repair method is provided for users who wish to continue working immediately.

For users who do not need to continue working immediately, it is possible to change only the broken shaft 20. To do this, after having detached the unit consisting of the bearing unit 21, the portion 20" of the shaft 20, and the cylindrical gear 34:

(1) Unscrew the nut 36;
(2) Take off the cylindrical gear 34;
(3) Remove the portion 20" of the shaft 20;
(4) Install a new unit consisting of a shaft 20 and a driver 17;
(5) Put the cylindrical gear 34 back into place; and
(6) Screw the nut 36 on again.

The example just described is only a preferred embodiment of the general idea taught by this invention as it is recited in the claims.

Actually, first of all it must be noted that, although the mower 1 of the example described is a mower carried in the rear, the invention also relates to a drawn mower, a mower carried in front, etc. Moreover, the invention relates also to such mowers equipped with elements for processing the product cut, such as elements for conditioning, elements for ensiling, elements for baling, etc.

In the example illustrated, the drive elements 8 housed in the carrying beam 12 are cylindrical gears 34, 35. However, the drive elements 8 can be different—such as, for example, conical gears driven by a drive shaft made in one or several parts extending lengthwise in the carrying beam 12. Moreover, while in the example illustrated the transmission of movement to the drive elements 8 is performed through the cutting element 10', this transmission can also be performed by a lateral transmission housing.

The shape of the cutting elements 10, 10', as well as their number, can also be different than the shape and number illustrated.

Finally, it will be understood that the break zone 41 and the stopping element 42 can be different from the groove 43 and from the shoulder 44.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A mower comprising:
   (a) a cutting bar provided with a carrying beam above which there extends a plurality of rotary cutting elements;
   (b) said rotary cutting elements each turning around a geometric axis directed upwardly;
   (c) one or several of said rotary cutting elements being driven from below by drive elements housed in said carrying beam and comprising gears;
   (d) said one rotary cutting element or each one of said several rotary cutting elements driven from below being rigidly connected to a corresponding shaft turning around a corresponding geometric axis and, for this purpose, being guided in a bearing unit comprising a bearing;
   (e) said bearing unit being connected rigidly to said carrying beam;
   (f) said shaft being rigidly connected at a lower end to a corresponding one of said gears; and
   (g) said shaft comprising a break zone in a zone extending upwardly outside said bearing,
   (h) whereby, during use of said mower, said corresponding rotary cutting element separates entirely from the cutting bar when said shaft breaks at the level of said break zone in case of an accidental contact of said rotary cutting element with an obstacle.

2. A mower according to claim 1 wherein said break zone comprises a large reduction in section of said shaft.

3. A mower according to claim 2 wherein said break zone is a groove.

4. A mower according to claim 1 wherein said shaft comprises in said zone extending upwardly outside said bearing a stopping element provided between said break zone and an inner race of said bearing and sized, shaped, and positioned to prevent translation of said shaft along the corresponding geometric axis after breaking of said shaft at the level of said break zone.

5. A mower according to claim 4 wherein said stopping element comprises a shoulder on said shaft.

6. A mower according to claim 4 wherein, before breaking of said shaft, there is a very slight play between said stopping element and said bearing.

7. A mower according to claim 6 wherein the height of said stopping element is small relative to the diameter of said shaft.

8. A mower according to claim 7 wherein the height of said stopping element does not exceed the value of an entry radius of the inner race of said bearing.

9. A mower according to claim 6 wherein the width of said stopping element is small relative to the diameter of said shaft.

10. A mower according to claim 1 wherein:
    (a) at an upper end, said shaft is rigidly connected to a driver to which the corresponding rotary cutting element driven from below is rigidly connected; and
    (b) an inner race of said bearing is clamped between said driven and said gear rigidly connected to the lower end of said shaft.

11. A mower according to claim 10 wherein:
    (a) said driver is rigidly connected, unable to be detached, to the upper end of said shaft;
    (b) said gear is connected detachably to the lower end of said shaft; and
    (c) the inner race of said bearing is clamped between said driver and said gear by a threaded connecting element screwed at the lower end of said shaft.

12. A mower according to claim 1 wherein said bearing is an angular contact bearing with two rows of balls an inner race of which is in two parts.

13. A mower according to claim 1 wherein:
    (a) said bearing unit is centered in a corresponding bore made in an upper part of said carrying beam;
    (b) an outside diameter of the corresponding gear is less than a diameter of said bore; and
    (c) said bearing unit is connected to said carrying beam by assembly elements that can be maneuvered from outside said carrying beam.

14. A cutting bar for a mower, said cutting bar comprising:
    (a) a carrying beam to be equipped with a plurality of rotary cutting elements adapted to extend above said carrying beam;
    (b) each one of said rotary cutting elements being adapted to turn around a geometric axis directed upwardly;
    (c) one or several of said rotary cutting elements being adapted to be driven from below by drive elements housed in said carrying beam and comprising gears;
    (d) said one rotary cutting element or each one of said several rotary cutting elements to be driven from below being adapted to be rigidly connected to a corresponding shaft turning around a corresponding geometric axis and, for this purpose, being guided in a bearing unit comprising a bearing;
    (e) said bearing unit being connected rigidly to said carrying beam;
    (f) said shaft being rigidly connected at a lower end to a corresponding one of said gears; and
    (g) said shaft comprising a break zone in a zone extending upwardly outside said bearing,
    (h) whereby, during use of said mower, said corresponding rotary cutting element is adapted to separate entirely from the cutting bar when said shaft breaks at the level of said break zone in case of an accidental contact of said rotary cutting element with an obstacle.

15. A cutting bar according to claim 14 wherein said break zone comprises a large reduction in section of said shaft.

16. A cutting bar according to claim 15 wherein said break zone is a groove.

17. A cutting bar according to claim 14 wherein said shaft comprises in said zone extending upwardly outside said bearing a stopping element provided between said break zone and an inner race of said bearing and sized, shaped, and positioned to prevent translation of said shaft along the corresponding geometric axis after breaking of said shaft at the level of said break zone.

18. A cutting bar according to claim 17 wherein said stopping element comprises a shoulder on said shaft.

19. A cutting bar according to claim 17 wherein, before breaking of said shaft, there is a very slight play between said stopping element and said bearing.

20. A cutting bar according to claim 19 wherein the height of said stopping element is small relative to the diameter of said shaft.

21. A cutting bar according to claim 20 wherein the height of said stopping element does not exceed the value of an entry radius of the inner race of said bearing.

22. A cutting bar according to claim 19 wherein the width of said stopping element is small relative to the diameter of said shaft.

23. A cutting bar according to claim 14 wherein:
(a) at an upper end, said shaft is rigidly connected to a driver to which the corresponding rotary cutting element driven from below is adapted to be rigidly connected; and
(b) an inner race of said bearing is clamped between said driver and said gear rigidly connected to the lower end of said shaft.

24. A cutting bar according to claim 23 wherein:
(a) said driver is rigidly connected, unable to be detached, to the upper end of said shaft;
(b) said gear is connected detachably to the lower end of said shaft; and
(c) the inner race of said bearing is clamped between said driver and said gear by a threaded connecting element screwed at the lower end of said shaft.

25. A cutting bar according to claim 14 wherein said bearing is an angular contact bearing with two rows of balls an inner race of which is in two parts.

26. A cutting bar according to claim 14 wherein:
(a) said bearing unit is centered in a corresponding bore made in an upper part of said carrying beam;
(b) an outside diameter of the corresponding gear is less than a diameter of said bore; and
(c) said bearing unit is connected to said carrying beam by assembly elements that can be manuevered from outside said carrying beam.

27. A mower comprising:
(a) a cutting bar provided with a carrying beam above which there extends a plurality of rotary cutting elements;
(b) said rotary cutting elements each turning around a geometric axis directed upwardly;
(c) one or several of said rotary cutting elements being driven from below by drive elements housed in said carrying beam and comprising gears;
(d) said one rotary cutting element or each one of said several rotary cutting elements driven from below being rigidly connected to a corresponding shaft turning around a corresponding geometric axis and, for this purpose, being guided in a bearing unit comprising a bearing;
(e) said bearing unit being connected rigidly to said carrying beam;
(f) said shaft being rigidly connected at a lower end to a corresponding one of said gears;
(g) said shaft comprising a break zone at an end extending upwardly outside said bearing; and
(h) said shaft comprising at its end extending upwardly outside said bearing a stopping element provided between said break zone and an inner race of said bearing and sized, shaped, and positioned to prevent translation of said shaft along the corresponding geometric axis after breaking of said shaft at the level of said break zone.

28. A mower according to claim 27 wherein said stopping element comprises a shoulder on said shaft.

29. A mower according to claim 27 wherein, before breaking of said shaft, there is a very slight play between said stopping element and said bearing.

30. A mower according to claim 29 wherein the height of said stopping element is small relative to the diameter of said shaft.

31. A mower according to claim 30 wherein the height of said stopping element does not exceed the value of an entry radius of the inner race of said bearing.

32. A mower according to claim 29 wherein the width of said stopping element is small relative to the diameter of said shaft.

33. A cutting bar for a mower, said cutting bar comprising:
(a) a carrying beam to be equipped with a plurality of rotary cutting elements adapted to extend above said carrying beam;
(b) each one of said rotary cutting elements being adapted to turn around a geometric axis directed upwardly;
(c) one or several of said rotary cutting elements being adapted to be driven from below by drive elements housed in said carrying beam and comprising gears;
(d) said one rotary cutting element or each one of said several rotary cutting elements to be driven from below being adapted to be rigidly connected to a corresponding shaft turning around a corresponding geometric axis and, for this purpose, being guided in a bearing unit comprising a bearing;
(e) said bearing unit being connected rigidly to said carrying beam;
(f) said shaft being rigidly connected at a lower end to a corresponding one of said gears;
(g) said shaft comprising a break zone at an end extending upwardly outside said bearing; and
(h) said shaft comprising at its end extending upwardly outside said bearing a stopping element provided between said break zone and an inner race of said bearing and sized, shaped, and positioned to prevent translation of said shaft along the corresponding geometric axis after breaking of said shaft at the level of said break zone.

34. A cutting bar according to claim 33 wherein said stopping element comprises a shoulder on said shaft.

35. A cutting bar according to claim 33 wherein, before breaking of said shaft, there is a very slight play between said stopping element and said bearing.

36. A cutting bar according to claim 35 wherein the height of said stopping element is small relative to the diameter of said shaft.

37. A cutting bar according to claim 36 wherein the height of said stopping element does not exceed the value of an entry radius of the inner race of said bearing.

38. A cutting bar according to claim 35 wherein the width of said stopping element is small relative to the diameter of said shaft.

* * * * *